United States Patent [19]

Agrawal et al.

[11] Patent Number: 5,262,145
[45] Date of Patent: Nov. 16, 1993

[54] CATALYST FOR AMMONIA CONVERSION TO HCN

[75] Inventors: Jitendra P. Agrawal, Memphis, Tenn.; Peter G. Gelblum, Philadelphia, Pa.

[73] Assignee: E. I. Du Pont de Nemours and Company, Wilmington, Del.

[21] Appl. No.: 847,126

[22] Filed: Mar. 6, 1992

Related U.S. Application Data

[63] Continuation-in-part of Ser. No. 592,177, Oct. 9, 1990, abandoned.

[51] Int. Cl.$^5$ .................. B01J 23/00; C01C 3/02
[52] U.S. Cl. .................. 423/372; 423/376; 502/325; 502/527
[58] Field of Search ........ 423/376, 372; 502/325, 502/527

[56] References Cited

U.S. PATENT DOCUMENTS

| | | | |
|---|---|---|---|
| 1,934,838 | 11/1933 | Andrussow | 23/151 |
| 2,607,663 | 8/1952 | Perry et al. | 423/376 |
| 2,666,689 | 1/1954 | Heider | 423/376 |
| 2,975,144 | 3/1961 | Gross et al. | 252/477 |
| 3,033,658 | 5/1962 | Gross et al. | 423/376 |
| 3,056,655 | 10/1962 | Inman | 423/376 |
| 3,215,495 | 11/1965 | Jenks et al. | 423/376 |
| 3,370,919 | 2/1968 | Pan | 23/151 |
| 4,469,666 | 9/1984 | Stephenson et al. | 423/376 |

OTHER PUBLICATIONS

Knapton, A. G., "The Structure of Catalyst Gauzes after Hydrogen Cyanide Production", Platinum Metals Review, vol. 22, No. 4, pp. 131-137, Oct., 1978.

*Primary Examiner*—Wayne Langel
*Attorney, Agent, or Firm*—Charles E. Krukiel

[57] ABSTRACT

The manufacture of hydrogen cyanide by the catalytic reaction of air/oxygen, ammonia and a hydrocarbon gas employing an improved catalytic reaction zone comprising a sequential array of layers/piles in which the surface density of the catalyst in layers/piles decreases from the entrance to the exit of the catalytic reaction zone.

18 Claims, No Drawings

CATALYST FOR AMMONIA CONVERSION TO HCN

RELATED APPLICATION

This application is a continuation-in-part of application Ser. No. 07/592,177, filed Oct. 9, 1990, abandoned.

FIELD OF THE INVENTION

The present invention relates to the manufacture of hydrogen cyanide by the reaction of air/oxygen, ammonia and a hydrocarbon gas in the presence of a catalyst consisting of one or more of the platinum metals. It relates, more particularly, to an improved catalytic reaction zone or bed for improved single-pass conversion of ammonia to hydrogen cyanide and embraces the discovery that single-pass conversion of ammonia to hydrogen cyanide can be improved by changing the surface density of catalyst, e.g. catalyst gauze, in response to the reduction in the ratio of oxygen to ammonia which occurs as the gaseous reactants move through the catalyst.

The catalyst employed in commercial processes for the formation of hydrogen cyanide from air, ammonia and a hydrocarbon gas is generally some form of platinum or one of its alloys. The catalyst may take the physical shape of wire gauze, metallic particles, plates, spirals or it may take the form of a metallic coating on various inert substrates. Wire gauzes may take the form of flat gauzes, cylindrical type gauzes or conical structures of gauzes.

A primary object of this invention is to provide a modified catalytic reaction zone which yields a higher conversion of ammonia to hydrogen cyanide than has been realized by employing the current set-up of platinum-rhodium alloy catalyst gauze. According to one embodiment, the invention comprises a catalyst pack which consists of a plurality of layers of platinum-rhodium alloy catalyst gauzes in a top pile, which the incoming stream of gaseous reactants contacts first, and a bottom pile consisting of a plurality of layers of platinum-rhodium alloy catalyst gauze or granular catalyst, wherein the catalyst layers in the top pile are a finer mesh than the catalyst layers in the bottom pile, i.e., the top pile has a higher surface density than the bottom pile. According to another embodiment, the improved catalytic reaction zone comprises a plurality of catalytic piles, such as gauze layers, wherein the surface density of each layer, or distinct group of layers, i.e., piles, decreases in graduations from the entrance having a catalyst gauze which can be as high as 200-400 mesh to the exit of the reaction zone where the catalyst gauze size can be in the range of from 5 to 20 mesh. According to yet another aspect of the invention, the catalytic reaction zone comprises at least four sheets of a platinum or a platinum alloy gauze of a single grade mesh size of at least 40 mesh up to about 400 mesh, and the sheets are arranged whereby the surface density of the catalyst decreases as the gaseous reactants move through the reaction zone.

BACKGROUND OF THE INVENTION

U.S. Pat. No. 3,244,479 discloses a method for regenerating gauze catalysts in situ. The discussed catalyst, of 90% platinum and 10% rhodium, consists of three layers of 80 mesh, 3 mil gauze.

U.S. Pat. No. 2,831,752 discloses a combination catalyst body employing gauze and granular material and a method for activating new catalysts and reactivating spent catalysts. The catalyst comprises at least one metallic gauze superimposed on a granular refractory material covered with a metallic coating. In normal practices, the granular material is about 6 to 10 mesh and is formed into a bed of about ¾ to 1½ inch (1.9 to 3.8 cm) thick and the overlayer comprises a single gauze. When more than one layer of gauze is employed, the layers are separated by ¼ inch (0.635 cm) layers of 6 to 10 mesh porcelain chips.

U.S. Pat. No. 2,975,144 discloses a method of catalyst support which eliminates contact of the catalyst with heat conductive holders, clamps or other metallic or heat conductive surfaces. The apparatus is thus constructed in such a manner that the catalyst temperature is as uniform as possible and that heat dissipation and loss of heat due to radiation is minimized. In a preferred embodiment, the wires that make up the gauze are of a thickness of about 0.16 to 0.20 mm. In addition, several layers of such catalyst gauzes, of unspecified mesh size, are placed one over the other to permit the use of a higher velocity of reaction gases.

U.S. Pat. No. 3,056,655 discloses a reactor design in which either catalyst gauze or finely divided catalyst particles are supported on layers of inert pellets which range in size from fine particles (⅛ inch [0.32 cm] cylinders) immediately underneath the catalyst layer to relatively coarse pellets (⅝ inch [1.59 cm] cylinders) at the downstream size of the reactor which are, in turn, supported on an insulating refractory plate. When catalyst gauze is used, the layer of graded pellets is optional. The purpose of the refractory plate is to insulate the catalyst from the metal surfaces of the heat exchanger. The inert pellets serve as catalyst support.

U.S. Pat. No. 3,545,939 discloses a support system for the catalyst used in the production of hydrogen cyanide in a conventional reactor. The support system consists of sillimanite grid tiles which support a bed of graded ceramic pellets—a layer of ⅝ inch (1.59 cm) pellets cover the tiles, on top of which is a layer of ⅜ inch (0.95 cm) pellets, which is covered by a layer of ¼ inch (0.635 cm) pellets. One additional layer of ceramic pellets cover the ¼ inch (0.635 cm) pellets. Covering the ceramic pellets is a corrugated ceramic material which supports several layers of platinum-rhodium gauze pads.

U.S. Pat. No. 4,469,666 discloses the design of a catalyst pack, the purpose of which is to improve the durability of platinum group metal catalyst gauzes used in the production of hydrocyanic acid. Improved durability implies that the same conversion efficiency of ammonia with less precious metal or that with the same quantity of precious metal, greater conversion is obtained. The catalyst pack is described as comprising woven metallic gauzes wherein at least some of the gauzes disposed at or towards the front of the pack are made from wire having a cross-sectional area greater than at least some of the gauzes disposed at or towards the rear of the pack. The "front" of the pack is considered to be that portion of the pack which gas entering the pack contacts first. For more than two stages, the cross-sectional area of the wire of the gauze or gauzes in any one stage is greater than the cross-sectional area of the wire of the gauzes or gauzes in the next succeeding stage considered in the direction of the flow of reactants through the unit.

SUMMARY OF THE INVENTION

The present invention relates to the manufacture of hydrogen cyanide by the reaction of air, ammonia and a hydrocarbon gas by passing the gaseous reactants through an improved catalytic reaction zone, by use of which it has been found that the single pass conversion of ammonia to hydrogen cyanide can be increased. According to one embodiment of the invention, the catalytic reaction zone comprises a catalyst pack, i.e., a closely packed high surface density sequential array of gauzes, or layer of granules, which consists of a top (i.e., inlet) pile of platinum-rhodium alloy catalyst gauzes and a bottom (i.e., outlet) pile of platinum-rhodium alloy metal catalyst gauzes or granular catalyst, wherein the top pile consists of a high density catalytic surface and is a finer mesh than the bottom pile which consists of gauze sheets having a distributed lower surface density. Each "pile" can comprise one or more individual sheets or layers of catalyst, provided, however, for best results the catalytic reaction zone has at least four (4) sheets or layers of catalyst.

According to another aspect of the invention, the catalytic reaction zone comprises a plurality of sequential piles of gauze or wire wherein the surface density of the piles decreases in a predetermined sequence from an entrance layer in which the gauze is in the range of from about 200 mesh to 400 mesh in size to an exit layer in which the gauze is in the range of from 2 mesh to 20 mesh in size.

According to another aspect, the catalytic reaction zone comprises at least four (4) sheets of a plantiunum or a platinum alloy gauze or wire of a single grade mesh size of at least 40 mesh up to 400 mesh, and the sheets are arranged whereby the surface density of the catalyst decreases as the gaseous reactants move through the reaction zone.

According to yet another aspect, the invention is an improved method for producing hydrogen cyanide which comprises feeding a gaseous mixture of reactants comprising nitrogen compounds, air, and carbon compounds to a reactor containing a catalytic reaction zone having at least two superposed piles of a catalyst comprising one or more platinum group metals. The first (entrance) pile comprises sheets of 40 to 100 mesh gauze, and the second (exit) pile comprises sheets of 20 to 40 mesh gauze, with the proviso that the mesh size of the first pile is finer than the mesh size of the second pile. When the catalytic reaction zone comprises two piles, the first pile will ordinarily contain from 33 to 67 weight percent of the platinum group metal present in the total catalyst reaction zone, and the second pile will ordinarily contain from 33 to 67 weight percent of the platinum group metal present in the total catalyst reaction zone.

In yet another aspect, the invention is a method for improving the % single pass conversion of ammonia to hydrogen cyanide which comprises passing the mixture of gaseous reactants through the catalytic reaction zone while changing the surface density of the catalyst in response to the reduction in the ratio of oxygen to ammonia which occurs as the gaseous reactants move through the zone. In addition to single pass conversion of ammonia to hydrogen cyanide, the invention also improves the conversion of hydrocarbon gas to hydrogen cyanide.

DETAILED DESCRIPTION OF THE INVENTION

Hydrogen cyanide formation proceeds according to one or the other of the following reactions:

$$NH_3 + CH_4 + 1.5O_2 \rightarrow HCN + 3H_2O$$

$$NH_3 + CH_4 \rightarrow HCN + 3H_2$$

The prior art (e.g., U.S. Pat. No. 1,934,838 to Andrussow, the teachings of which are incorporated herein by reference) teaches that oxygen (either as pure oxygen or as an oxygen-containing gas, e.g., air) can be used in hydrogen cyanide synthesis to burn with a hydrocarbon gas and ammonia and thereby provide the energy input required to form hydrogen cyanide from ammonia and the hydrocarbon gas, e.g., methane. The prior art (e.g., U.S. Pat. No. 4,469,666 to Stephenson) also teaches that the bulk of the reaction (and, therefore, a significant consumption of gaseous reactants) occurs within the catalytic reaction zone in the proximity of the catalyst, i.e., gauze layers, positioned towards the front of the bed (considered in the direction of gases passing through the bed).

Kinetic reaction studies suggest that the overall synthesis of hydrogen cyanide from a mixture of gaseous reactants comprising ammonia, methane and air consists of a first rapid exothermic oxidation-driven synthesis reaction which tends to thrive in the presence of platinum metal surfaces having a high surface density. We speculate that the oxidation synthesis of hydrogen cyanide is followed immediately within the catalytic reaction zone by a somewhat slower endothermic hydrocyanation synthesis reaction which produces some additional hydrogen cyanide and occurs most readily in the presence of more distributed platinum metal surfaces of a lower surface density. "Density" refers to surface area of catalyst per unit volume within a catalyst pile, i.e., surface area available within an array of one or more sheets of catalyst gauze per unit volume. Kinetic calculations suggest that the ratio of air to ammonia and the concentration of Pt oxidizing and Pt etching radicals like $HO_2$ and oxidizing species like $H_2O_2$ are significantly reduced as the mixture of gaseous reactants moves through the catalytic reaction zone, i.e., through the piles of catalyst gauze sheets, and, therefore, that the character of the hydrogen cyanide synthesis reaction is transformed to the extent that by passing the gaseous reactants through a modified catalytic reaction zone as described herein, e.g., first through a somewhat shallow pile of gauze sheets having a relatively high surface density and then immediately through a somewhat deeper pile of gauze sheets having a relatively lower surface density, the conversion of ammonia to hydrogen cyanide is improved. Optionally, one or more intermediate catalyst piles can be arranged between the highest surface density and lowest surface density piles being employed.

The present invention, therefore, results from the discovery that a change in the surface area, i.e. surface density, of the platinum metal catalyst gauze which takes into account the change in the relative concentrations of the gaseous reactants, especially the expected reduction in oxygen content, i.e., the reduction in the ratio of oxygen to ammonia, as the reaction proceeds improves the single-pass conversion of ammonia to hydrogen cyanide.

The platinum metal catalyst employed in the process of this invention may be one of the platinum group metals, defined to be platinum, rhodium, iridium, palladium, osmium or ruthenium, or a mixture or alloy of two or more of these metals. The preferred alloy contains from about 50% up to 100% platinum. The most preferred alloy consists of at least 90% platinum and the balance rhodium.

According to one aspect of the invention, the platinum metal catalyst pack may be employed in the form of a top pile or portion comprising catalyst gauzes and a bottom pile of catalyst gauzes, wherein the top gauze layers are a finer mesh than the bottom gauze layers. The top of the catalyst pack is considered to be that portion of the pack which gas entering the pack contacts first. Each pile may consist of one or more catalyst gauzes. It is not necessary that each pile be composed of an equal number of catalyst gauzes or of an equal weight of catalyst, but generally when the catalytic reaction zone of the invention comprises two distinct portions or piles, the catalytic metal in the upper portion will comprise from 33 to 67 wt. % of the catalytic metal present in the zone and the bottom portion will also contain from 33 to 67 wt. %.

A granular catalyst may also be used in combination with a catalyst gauze, an example of which is given in U.S. Pat. No. 2,831,752. Platinum metal catalyst employed as a granular catalyst may be one of the platinum metals as defined above. The granular catalyst may be in the form of metal pellets, spheres, chips, turnings, etc., or in the form of platinum metal alloy catalyst coating on an inert substrate such as beryl (beryllium aluminum silicate), alumina, sillimanite, etc.

In a preferred aspect of the invention, the wire forming the mesh in both layers is about the same diameter of about 1 to 5 mils ($2.54 \times 10^{-5}$ to $12.7 \times 10^{-5}$ m). When the catalytic reaction zone comprises two piles, the preferred mesh size is from 40 to 100 mesh for the upper or front pile and from 20 to 40 mesh for the bottom or back pile of the catalyst bed, provided that the mesh size of the upper pile is finer than the mesh size of the lower pile. Generally, the top pile should have a mesh size from 1.5 to 5 times the mesh size of the bottom pile of the catalyst bed. When using a catalyst bed consisting of gauze and particles, the mesh size of the top gauze pile should be from 40 to 100 mesh and the particle size of the bottom pile should be from 2.0 to 10.0 mm. Generally, the total catalyst bed will be from 0.5 to 6.00 inches in thickness.

The usefulness of the invention will now be illustrated by way of a typical hydrogen cyanide reactor with a reaction mixture containing a controlled composition of air, ammonia and methane that is passed over a platinum metal catalyst as described in greater detail in U.S. Pat. No. 1,934,838 to Andrussow, the teachings of which are incorporated herein by reference. The composition of the said reaction mixture is controlled to contain about 1 volume of methane or natural gas to 1 volume of ammonia and air equivalent of 25% to 50% of the amount that would be required for complete oxidation of the ammonia and methane to water, nitrogen and carbon dioxide. In carrying out the hydrogen cyanide synthesis, maximum yields are obtained when reaction conditions are maintained in such a manner that the product gas always contains unreacted hydrocarbon equivalent to 0.1 to 0.3% by volume of methane.

The reactant mixture which is preferred for the synthesis of hydrogen cyanide is a mixture of ammonia, methane or natural gas, and air. It is to be understood, however, that the process of this invention may be employed with mixtures of nitric oxide and hydrocarbons; ammonia, methane and oxygen; and other mixtures of gases comprising nitrogen compounds, oxygen and carbon compounds, including hydrocarbons and carbon oxides. Other reactions in which this combination catalyst pack may be employed will be apparent to those skilled in the art.

The process may be carried out at any pressure, i.e., at atmospheric, superatmospheric or subatmospheric. In practicing this process of making hydrogen cyanide, conventional gas mixtures, reaction conditions, materials of construction for the reactor, preheater, etc. and methods of working up the combustion products are employed and need not be described in detail.

Many variations in conditions from those given in the examples can be made without departing from the scope of the invention. Contemplated equivalents include catalyst piles which employ the same mesh size, e.g., 80 mesh throughout, which are arranged to create a sequential decrease in surface density as one moves from the entrance to the exit of the catalytic reaction zone.

EXAMPLES

The data from a side-by-side comparison of a 40 mesh catalyst pack (B converter), a 80 mesh catalyst pack (A converter) and equal weight of a 40 and 80 mesh catalyst pack (C converter) are reported in Examples 1, 2 and 3. In the process, reactants air, ammonia and natural gas were passed, on a single pass once-through basis, through the catalyst pack.

The same weight loading of 90% platinum-10% rhodium alloy catalyst was used in each converter. In each catalyst pack, a single 20 mesh sheet of 9 mil ($2.3 \times 10^{-4}$ m) wire was placed at the bottom to provide structural support of the catalyst pack. For the mixed bed catalyst pack, the 80 mesh sheets were layered on top of the 40 mesh sheets with the 20 mesh sheet on the bottom, downstream of the gas flow. The catalyst gauze for the 40 and 80 mesh gauze was made with 3 mil ($7.62 \times 10^{-5}$ m) wire. "Yield" as used herein refers to a percent derived from moles HCN formed/moles $NH_3$ fed. "Selectivity" as used herein refers to a percent derived from moles HCN formed/moles $NH_3$ consumed.

EXAMPLE 1

Catalyst Bed: 80 mesh - 2 sheets
40 mesh - 32 sheets
20 mesh - 1 sheet
Total number of sheets = 35
Total weight of catalyst = 1037 Troy ounces
B Converter Data
Forty Mesh Bed

|   | Day | $NH_3$ Yield % | Selectivity of HCN from $NH_3$ % | Unreacted $NH_3$ % |
|---|-----|----------------|----------------------------------|---------------------|
| 1 | 1   | 62.4 | 78.1 | 20.1 |
| 2 | 3   | 65.4 | 81.7 | 20.0 |
| 3 | 8   | 66.1 | 79.1 | 16.4 |
| 4 | 10  | 65.4 | 77.8 | 16.0 |
| 5 | 15  | 63.4 | 77.3 | 18.0 |
| 6 | 22  | 67.1 | 82.1 | 18.3 |
| 7 | 32  | 64.6 | 78.8 | 18.1 |
| 8 | 36  | 64.5 | 80.7 | 20.1 |
| 9 | 37  | 66.9 | 81.7 | 18.2 |
| 10 | 43 | 65.3 |      |      |
| 11 | 52 | 68.6 | 82.3 | 16.6 |
| 12 | 57 | 65.3 | 83.7 | 22.0 |

-continued

Catalyst Bed: 80 mesh - 2 sheets
40 mesh - 32 sheets
20 mesh - 1 sheet
Total number of sheets = 35
Total weight of catalyst = 1037 Troy ounces
B Converter Data
Forty Mesh Bed

| Day | NH₃ Yield % | Selectivity of HCN from NH₃ % | Unreacted NH₃ % |
|---|---|---|---|
| 13 | 59 | 64.5 | 80.0 | 19.4 |
| 14 | 64 | 63.8 | 79.7 | 20.0 |
| 15 | | | | |
| 16 | MEAN | 65.2 | 80.2 | 18.7 |
| 17 | STDEV | 1.6 | 2.0 | 1.7 |
| 18 | 66 | 60.1 | 76.9 | 21.8 |
| 19 | 68 | 59.8 | 76.5 | 21.9 |
| 20 | 77 | 61.0 | 75.9 | 19.6 |
| 21 | 84 | 63.3 | 78.6 | 19.5 |
| 22 | 91 | 67.8 | 86.5 | 21.6 |
| 23 | 96 | 62.6 | 84.2 | |
| 24 | 98 | 66.4 | 85.7 | 22.6 |
| 25 | 103 | 61.9 | 80.4 | 23.0 |
| 26 | 105 | 62.4 | 77.5 | 19.6 |
| 27 | 110 | 60.4 | 78.1 | 22.7 |
| 28 | 112 | 61.7 | 78.3 | 21.3 |
| 29 | 117 | 60.5 | 77.6 | 22.0 |
| 30 | | | | |
| 31 | MEAN | 63.9 | 80.0 | 20.0 |
| 32 | STDEV | 2.5 | 2.9 | 2.1 |

(Note: first column contains Day values, but rows 13-14 appear shifted. Reading as Day | NH₃ Yield | Selectivity | Unreacted.)

EXAMPLE 2

Catalyst Bed: 80 mesh - 9 sheets
40 mesh - 18 sheets
20 mesh - 1 sheet
Total number of sheets = 28
Total weight of catalyst - 1037 Troy ounces
C Converter Data
Mixed Bed of 80 and 40 Mesh (50:50 by wt.)

| | Day | NH₃ Yield % | Selectivity of HCN from NH₃ % | Unreacted NH₃ % |
|---|---|---|---|---|
| 1 | 1 | 72.8 | 87.3 | 16.6 |
| 2 | 6 | 72.6 | | |
| 3 | 13 | 75.4 | 88.3 | 14.5 |
| 4 | 15 | 74.3 | 87.8 | 15.3 |
| 5 | 20 | 72.0 | 89.1 | 19.1 |
| 6 | 27 | 72.7 | 85.7 | 15.1 |
| 7 | 36 | 72.6 | 87.1 | 16.7 |
| 8 | 41 | 72.6 | | |
| 9 | 43 | 72.6 | 86.5 | 16.1 |
| 10 | 48 | 69.6 | 86.3 | 19.3 |
| 11 | 50 | 70.8 | 85.6 | 17.3 |
| 12 | 55 | 69.1 | 84.0 | 17.7 |
| 13 | 57 | 68.5 | 82.5 | 17.0 |
| 14 | 62 | 64.6 | 78.3 | 17.5 |
| 15 | 69 | 63.5 | 79.0 | 19.6 |
| 16 | 74 | 65.3 | 83.4 | 21.8 |
| 17 | | | | |
| 18 | MEAN | 70.6 | 85.1 | 17.4 |
| 19 | STDEV | 3.5 | 3.3 | 2.0 |
| 20 | 76 | 65.1 | 77.5 | 16.0 |
| 21 | 83 | 68.6 | 81.8 | 16.1 |
| 22 | 90 | 67.3 | 79.5 | 15.3 |
| 23 | 97 | 66.9 | 75.8 | |
| 24 | 102 | 63.5 | | |
| 25 | 109 | 66.8 | 82.9 | 19.3 |
| 26 | 111 | 69.2 | | |
| 27 | 116 | 63.3 | 75.3 | 16.0 |
| 28 | 118 | 66.1 | 76.3 | 13.4 |
| 29 | 123 | 64.9 | 75.8 | 14.4 |
| 30 | | | | |
| 31 | MEAN | 68.9 | 82.6 | 16.9 |
| 32 | STDEV | 3.7 | 4.6 | 2.0 |

EXAMPLE 3

Catalyst Bed: 80 mesh - 18 sheets
40 mesh - 0 sheets
20 mesh - 1 sheet
Total number of sheets = 19
Total weight of catalyst = 1037 Troy ounces
A Converter Data
80 Mesh Bed

| | Day | NH₃ Yield % | Selectivity of HCN from NH₃ % | Unreacted NH₃ % |
|---|---|---|---|---|
| 1 | 1 | | 79.2 | 24.3 |
| 2 | 3 | 71.9 | | 21.6 |
| 3 | 8 | 66.3 | 82.8 | 20.0 |
| 4 | 15 | 68.4 | 83.4 | 18.0 |
| 5 | 17 | 68.3 | 87.2 | 21.7 |
| 6 | 22 | 65.7 | 83.7 | 21.5 |
| 7 | 24 | | | 22.9 |
| 8 | 29 | 66.8 | 86.9 | 21.0 |
| 9 | 31 | 68.5 | 86.9 | 21.2 |
| 10 | 38 | 71.0 | | 22.6 |
| 11 | 43 | 69.5 | | 23.6 |
| 12 | 45 | 69.5 | | 23.4 |
| 13 | 50 | 67.6 | 86.9 | 22.2 |
| 14 | 52 | | | 20.5 |
| 15 | 57 | 70.8 | | 23.2 |
| 16 | 59 | | | 22.0 |
| 17 | 64 | 69.7 | 89.7 | 22.3 |
| 18 | 68 | 66.3 | 85.2 | 22.3 |
| 19 | 73 | 69.1 | | 24.1 |
| 20 | | | | |
| 21 | MEAN | 68.2 | 85.2 | 22.0 |
| 2 | STDEV | 1.8 | 3.0 | 1.5 |
| 23 | 75 | 64.2 | 86.9 | 26.1 |
| 24 | 79 | 64.3 | 81.3 | 23.4 |
| 25 | 82 | 65.8 | 83.1 | 20.8 |
| 26 | 87 | | | 21.1 |
| 27 | 94 | 63.1 | 80.1 | 21.3 |
| 28 | 99 | 65.4 | 89.6 | |
| 29 | 101 | 63.8 | 86.1 | |
| 30 | | | | |
| 31 | MEAN | 67.3 | 84.9 | 22.1 |
| 32 | STDEV | 2.7 | 3.1 | 1.6 |
| 33 | 106 | 59.6 | 81.4 | |
| 34 | 108 | 58.9 | 74.2 | |
| 35 | 113 | 57.6 | 75.1 | |
| 36 | 115 | 59.7 | 77.8 | 23.3 |
| 37 | 120 | 59.7 | 77.0 | 22.5 |
| 38 | | | | |
| 39 | MEAN | 65.6 | 83.1 | 22.2 |
| 40 | STDEV | 4.1 | 4.5 | 1.6 |

COMPARISON OF EXAMPLES

After 2-½ months of operation:

B converter (40 mesh): 65.2/80.2 (% ammonia yield[1]/selectivity)

A converter (80 mesh): 68.2/85.2

C converter (mixed): 70.6/85.1

Although a natural gas quality upset, after 2½ months of operation, caused the performance of the process to drop off, the general trend of the increased ammonia yield to hydrogen cyanide for the improved catalyst pack when compared to the 40 or 80 mesh catalyst pack alone remained the same.

After 4 months of operation:

B converter (40 mesh): 63.9/80.0

A converter (80 mesh): 65.6/83.1

C converter (mixed): 68.9/82.6.

[1]Yield = conversion to HCN from NH₃ fed. (Moles HCN formed/Moles ammonia fed)

We claim:

1. A process for producing hydrogen cyanide comprising feeding a gaseous mixture comprising nitrogen compounds, oxygen and carbon compounds to a reactor containing a catalytic reaction zone comprising two superposed piles of catalyst comprising one or more platinum group metals, the first catalytic pile containing from 33 to 67 weight percent of the platinum group metal present in the total catalytic reaction zone in the form of 40 to 100 mesh gauze or 0.2 to 1.0 mm size particles and the second catalytic pile containing from 33 to 67 weight percent of the platinum group metal present in the total catalyst reaction zone in the form of a 20 to 40 mesh gauze or 2 to 10 mm size particles, provided, however, that when the form of catalyst is gauze, the mesh size of the first pile is finer than the mesh size of the second pile.

2. The process of claim 1 wherein the catalytic piles are in the form of particles and the second pile contains particles from 5 to 10 times the diameter of the particles in the first pile.

3. The process of claim 2 wherein the reaction is carried out at from about 1000° to 1200° C.

4. The process of claim 3 wherein the catalyst contains between 50 and 90 weight percent platinum.

5. The process of claim 4 wherein the feed to the reactor consists essentially of a mixture of ammonia, methane and air.

6. The process of claim 5 wherein the catalyst consists essentially of at least about 90 weight percent platinum and the balance rhodium.

7. The process of claim 1 wherein both catalytic piles are in the form of a mesh gauze and the mesh size of the first pile is from 1.5 to 5 times the mesh size of the second pile.

8. The process of claim 7 wherein the reaction is carried out at from about 1000° to 1200° C.

9. The process of claim 8 wherein the catalyst contains between about 50 and 90 weight percent platinum.

10. The process of claim 9 wherein the feed to the reactor consists essentially of a mixture of ammonia, methane and air.

11. The process of claim 10 wherein the wires forming the mesh in both piles are from about 1 to 5 mils in diameter.

12. The process of claim 11 wherein the catalyst consists essentially of at least about 90 weight percent platinum and the balance rhodium.

13. In a process for preparing hydrogen cyanide by reacting a mixture of air, ammonia and a hydrocarbon gas in the presence of a catalyst comprising one or more platinum group metals, a method for improving the % single-pass conversion of ammonia to hydrogen cyanide in said process which comprises:
(a) forming the catalyst into a catalytic reaction zone comprising a sequential array of gauzes in which the surface density of said gauze decreases from the entrance in which the gauze is in the range of from 200 to 400 mesh in size to the exit in which the gauze is in the range of from 5 to 20 mesh in size; and
(b) passing said mixture through said catalytic reaction zone.

14. The process of claim 13 in which the % single-pass conversion of ammonia to hydrogen cyanide is accomplished by:
(a) forming the catalyst into a catalyst bed comprising two superposed piles, said first pile containing from 33 to 67 weight percent of the platinum group metal present in the total catalyst bed and having the form of 40 to 100 mesh gauze or from 0.02 to 1.0 mm size particles, and said second pile of catalyst containing from 33 to 67 weight percent of the platinum group metal present in the total catalyst bed and having the form of a 20 to 40 mesh gauze or from 2 to 10 mm size particles; and
(b) passing said mixture through said first catalyst pile and then through said second catalyst pile, with the proviso that when the catalyst is gauze, the mesh size of the first pile is finer than the mesh size of the second pile.

15. A process for producing hydrogen cyanide comprising feeding a gaseous mixture comprising nitrogen compounds, oxygen and carbon compounds to a reactor containing a catalytic reaction zone which comprises a sequential array of gauzes which contain one or more platinum group metals in which the surface density of the gauzes decreases from the entrance to the exit according to the change which occurs in the ratio of oxygen to ammonia as the reaction proceeds.

16. The process of claim 15 in which the surface density of the gauzes decreases from 200 to 400 mesh in size at the entrance to from 5 to 20 mesh in size at the exit of the catalytic reaction zone.

17. An improved catalyst pack for reacting a gaseous mixture comprising nitrogen compounds, oxygen or air and carbon compounds to produce hydrogen cyanide which comprises a sequential array of at least four gauze sheets or series of sheets, the wire comprising the gauze containing one or more platinum group metals, and the sheets arranged such that the surface density of the gauze decreases from the entrance in which the gauze is in the range of from 200 to 400 mesh in size to the exit in which the gauze is in the range of from 5 to 20 mesh in size, with the proviso that the mesh size of each sheet or series of sheets moving from the entrance to the exit of the catalyst pack is finer than the mesh size of the next sheet or series of sheets in the sequence.

18. The improved catalyst pack of claim 17 wherein the mesh is formed of at least about 90 weight percent platinum and the balance rhodium.

* * * * *